UNITED STATES PATENT OFFICE.

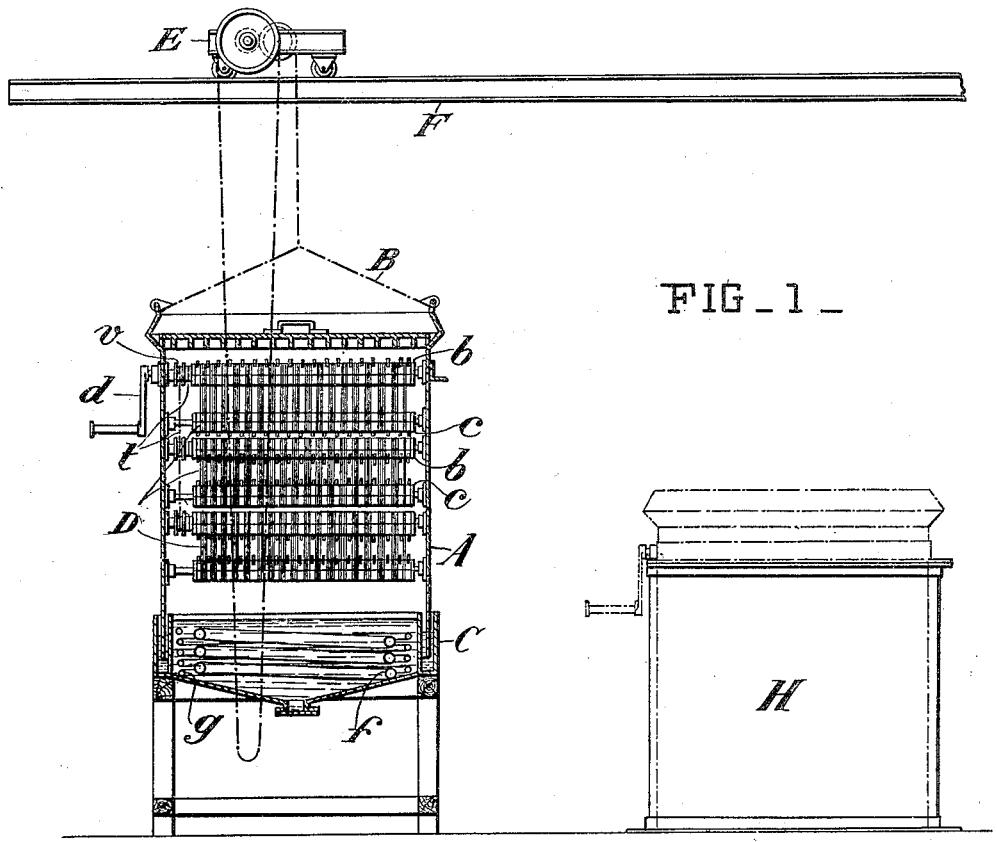

PETER SCHMID, OF BASEL, SWITZERLAND.

APPARATUS FOR UNGUMMING SILK.

No. 822,774.

Specification of Letters Patent.

Patented June 5, 1906.

Application filed July 15, 1905. Serial No. 269,877.

*To all whom it may concern:*

Be it known that I, PETER SCHMID, a citizen of the Swiss Republic, and a resident of Basel, Switzerland, have invented a new and useful Apparatus for Ungumming Silk, of which the following is a full, clear, and complete specification.

This apparatus allows the ungumming of silk by first treating the same with soap-lather in presence of steam and air for the purpose of softening and rendering soluble the sericin envelop and by afterward eliminating the latter simply by washing in water.

In the accompanying drawings, Figures 1 and 2 are two vertical sections of the apparatus especially constructed for the treatment of silk in hanks.

In the figures, A indicates a metal casing open at the bottom and covered at its upper part with a cover B, not closed with a tight joint. The lower edges of this casing are immersed in the liquid contained in the double wall of a vessel C, thus making a hydraulic joint, the said vessel C containing soapy water. The hanks D are suspended in several superposed rows on hank-holders $b$ $c$, supported by two opposite walls of the casing A in such a manner as to be capable of rotation, the upper hank-holders $b$ of each row being provided with pinions $v$, over which pass sprocket-chains $t$ and one of the said hank-holders $b$ being adapted to be rotated by a crank-handle $d$, so that by the rotation of the latter all the upper hank-holders $b$ can be caused to revolve, and consequently the hanks are caused to turn around the hank-holders $b$ $c$.

The vessel C is provided with a coil of pipe $f$, allowing of steam-heating the soapy water contained therein, and with a second coil of pipe $g$, allowing of injecting air (cold or hot) under pressure into the said water for the purpose of assisting the formation of the soap-lather. At its lower part the vessel C is provided with a discharge-aperture allowing of withdrawing the solid deposits accumulating on the inclined bottom of the vessel. The cover B of the casing A is provided on its lower face with regularly-spaced ribs, which compel the steam condensing thereon to fall in uniformly-distributed drops over the hanks of silk contained in the said casing. Moreover, this cover is provided with valves (not shown in the drawings) allowing of air being admitted as required into the apparatus.

The casing A is suspended from a windlass E, running upon rails F, so that the said casing A can be lifted in order to be withdrawn from the vessel C and be brought to a second vessel H, placed by the side of the vessel C and in which is to be effected the washing of the silk treated above the vessel C with steam, soap-lather, and air. This vessel H will consequently receive the water for removing the fiber the sericin envelop softened and rendered soluble above the vessel C.

For ungumming one hundred kilograms, for example, of raw-silk hanks we proceed as follows: The hanks are suspended on the hank-holders $b$ $c$ in the casing A, and the latter is brought, as indicated by the full lines in Figs. 1 and 2, over the vessel C, containing about five hundred and eighty liters of water, in which thirty-three kilograms of soap have been dissolved. Steam is caused to enter the coil $f$ for bringing the soapy water to boiling-point, and subsequently also air is admitted under pressure through the coil $g$. The soapy water in the vessel C on reaching boiling-point will pass into a state of lather, and this lather will rise in the casing along the hanks contained therein and envelop the latter at all parts, so that the said hanks will be subjected to the combined action of steam, hot air, and soap-lather, the effect of which will be to soften and render soluble the sericin envelop. If air be not injected through the coil $g$, the outer air can be allowed to enter the casing A at the periphery of its non-jointing cover B or by more or less opening the valves adapted to the said cover. In about thirty-five minutes the sericin envelop will be sufficiently softened and rendered soluble. The casing A is then lifted from the vessel C by means of the windlass E and brought by the latter over the vessel H, and the casing A is caused to descend over this vessel, as indicated in dotted lines in Fig. 1. The hanks are then caused to turn in the water in the vessel H by turning the crank-handle $d$. By this first washing-bath about four-fifths of the sericin envelop will be removed, and the removal can be completed by a second treatment above the vessel C, followed by a second washing in the vessel H or in another similar vessel. Very pure sericin solutions are thus obtained, which can be ultimately employed for dyeing purposes. The liquid remaining in the vessel C after the first treatment will be reduced, through loss of steam, to about three-fifths of its former volume. It can be used for a further treatment of the same silk or of another silk by adding thereto about two hundred and thirty to two hundred and forty liters of water and about 16.5 to twenty-two kilograms of soap, the quantity of soap to be employed varying with the nature of the raw silk to be treated.

When the apparatus shall be employed for ungumming silk-waste, tissues of natural silk, or of natural-silk waste, the silk-holders will be conveniently modified for this purpose. Thus for ungumming silk-waste or hanks of silk or of silk-waste the rotatable hank-holders *b c* may be replaced by trellis-frames or trellis-baskets receiving the natural silk to be ungummed. These trellis-frames or trellis-baskets may be supported directly by the casing A or by endless sprocket-chains allowing to bring the said trellis-frames or trellis-baskets at various heights in the casing A.

What I claim is—

1. An apparatus for the purpose specified, comprising a sectional receptacle for treating the silk with soap-lather, consisting of a vessel provided with means for heating soapy water, an inlet for air under pressure, and an annular chamber for sealing liquid, and an upright metal casing, open at both ends and having a loosely-fitting cover at its upper end, the lower end of said casing engaging the said annular chamber in the lower section, for sealing, rotative supports within said casing for hanks of silk to be treated, a washing vessel, and means for lifting said casing from its supporting vessel and transferring it to the washing vessel.

2. An apparatus for the purpose specified, comprising a sectional receptacle for treating the silk with soap-lather, consisting of a vessel provided with means for heating soapy water, an inlet for air under pressure, and an annular chamber for a sealing liquid, and an upright metal casing, open at both ends and having a loosely-fitting cover at its upper end, the lower end of said casing engaging the said annular chamber in the lower section, for sealing, means within said casing for supporting the silk to be treated, a washing vessel, and means for lifting said casing from its supporting vessel and transferring it to the washing vessel.

3. An apparatus for the purpose specified, comprising a sectional receptacle for treating the silk with soap-lather, consisting of a vessel provided with means for heating soapy water, and an annular chamber for a sealing liquid, and an upright metal casing open at both ends and having a loosely-fitting cover at its upper end, the lower end of said casing engaging the said annular chamber in the lower section, for sealing, means within said casing for supporting the silk to be treated, a washing vessel, and means for lifting said casing from its supporting vessel and transferring it to the washing vessel.

In witness whereof I have hereunto signed my name, this 3d day of July, 1905, in the presence of two subscribing witnesses.

PETER SCHMID.

Witnesses:
 ALBERT GROUTE,
 GEORGE GIFFORD.